United States Patent
Clements

(10) Patent No.: US 9,932,518 B2
(45) Date of Patent: Apr. 3, 2018

(54) METHOD FOR ENHANCING THE PERMEABILITY OF A GEOLOGICAL FORMATION

(71) Applicant: James George Clements, Brentwood, NJ (US)

(72) Inventor: James George Clements, Brentwood, NJ (US)

(73) Assignee: Montgomery Chemicals LLC, Conshohocken, PA (US)

(*) Notice: Subject to any disclaimer, the term of this patent is extended or adjusted under 35 U.S.C. 154(b) by 310 days.

(21) Appl. No.: 14/276,206

(22) Filed: May 13, 2014

(65) Prior Publication Data

US 2014/0338914 A1   Nov. 20, 2014

Related U.S. Application Data

(60) Provisional application No. 61/822,940, filed on May 14, 2013.

(51) Int. Cl.
*E21B 43/26* (2006.01)
*C09K 8/80* (2006.01)
*C09K 8/66* (2006.01)
*C09K 8/72* (2006.01)

(52) U.S. Cl.
CPC .......... *C09K 8/80* (2013.01); *C09K 8/66* (2013.01); *C09K 8/72* (2013.01); *E21B 43/26* (2013.01)

(58) Field of Classification Search
CPC ........ E21B 43/255; C09K 8/602; C09K 13/02
USPC ........................................ 166/307
See application file for complete search history.

(56) References Cited

U.S. PATENT DOCUMENTS

| | | | |
|---|---|---|---|
| 2,872,982 A * | 2/1959 | Wade | C09K 8/845 166/300 |
| 2,889,884 A * | 6/1959 | Henderson | E21B 43/32 166/300 |
| 5,804,329 A | 9/1998 | Amendola | |
| 6,358,488 B1 | 3/2002 | Suda | |
| 6,534,033 B1 | 3/2003 | Amendola et al. | |
| 6,780,804 B2 | 8/2004 | Webber et al. | |
| 7,036,591 B2 | 5/2006 | Cannan et al. | |
| 7,306,780 B1 * | 12/2007 | Kravitz | B01J 7/02 423/279 |
| 7,666,469 B2 | 2/2010 | Weintritt et al. | |
| 7,874,360 B2 | 1/2011 | Welton et al. | |
| 7,931,084 B2 | 4/2011 | Nguyen et al. | |

(Continued)

FOREIGN PATENT DOCUMENTS

| | | |
|---|---|---|
| RU | 2153065 C1 | 7/2000 |
| RU | 2219332 C1 | 12/2003 |
| RU | 2401941 C1 | 10/2010 |

OTHER PUBLICATIONS

A. Eremeeva, International Search Report, PCT/US2014/037933, dated Sep. 11, 2014, ISA/RU:FIPS, Moscow, Russia.

(Continued)

*Primary Examiner* — William D Hutton, Jr.
*Assistant Examiner* — Ashish K Varma
(74) *Attorney, Agent, or Firm* — Paul & Paul

(57) ABSTRACT

A method for increasing the permeability of a geologic formation by fracturing includes the step of pumping a solution of a borohydride into a well bore. The solution may also include a basic material such as sodium hydroxide. This step may be followed by pumping a second acidic solution into the well bore.

14 Claims, 2 Drawing Sheets

(56) References Cited

U.S. PATENT DOCUMENTS

| | | |
|---|---|---|
| 7,976,949 B2 | 7/2011 | Dickson et al. |
| 8,604,132 B2 | 12/2013 | Jakubowski et al. |
| 8,614,157 B2 | 12/2013 | Pope et al. |
| 2012/0225800 A1 | 9/2012 | Hendrickson |
| 2013/0146288 A1 | 6/2013 | Smith et al. |

OTHER PUBLICATIONS

A. Eremeeva, Written Opinion of the International Searching Authority, PCT/US2014/037933, dated Sep. 11, 2014, ISA/RU:FIPS, Moscow, Russia.

Floyd Farris; J.B. Clark; "Hydraulic fracturing" Invention date 1947; Wikipedia, the free encyclopedia; pp. 1-26 dated May 19, 2014.

* cited by examiner

METHOD FOR ENHANCING THE PERMEABILITY OF A GEOLOGICAL FORMATION

CROSS REFERENCE TO RELATED APPLICATIONS

This application claims the benefit of the priority of U.S. Provisional Application No. 61/822,940, filed May 14, 2013, which is incorporated by reference herein in its entirety.

BACKGROUND OF THE INVENTION

1. Field of Invention

The present invention relates to methods and fluid compositions for use in the extraction of hydrocarbons such as petroleum or natural gas from geological formations.

2. Description of the Related Art

"Fracking," short for "fracturing," is popular term for a collection of related techniques for increasing the permeability of geologic formations including hydrocarbons such as petroleum and natural gas, in order to increase the quantity of material that can be extracted from a given formation. Typically, these techniques involves injecting fracking fluid at high enough pressure into a well for the purpose of causing fractures or cracks in the formation emanating from the well and continuing deep into the formation. These cracks provide channels for the flow of trapped formation fluids such as, for example, gas, oil, water, etc., to the well bore. Fracking is applied to many formations improve the flow from the formation. Fracking is employed for the purpose of restoring or improving the porosity of the formation, and thus the permeability of the formation, by opening up the substrate or formation, so that the desired fluid or product can flow more easily to the well pipe.

Fracking is often accomplished by hydraulic methods, pneumatic methods, or by a combination of these methods. Hydraulic fracking is accomplished by pumping a liquid, usually water, along with "proppants," such as sand or ceramic materials, and often various chemical additives, into the well, forcing the substrate or formation to expand, and resulting in the creation of cracks or wormholes that facilitate the flow of fluids trapped in the formation to the well pipe. Often the injection material is pumped so fast that substantial hydraulic pressure is realized in the well, and the rate of dissipation is often measured as means of judging effectiveness.

The pneumatic method is similar. Enough pressure is generated by pumping gas into the well to force the surrounding formation to expand, which leads to crack formation and increased porosity, and, if proppants are used, to force the proppants into the cracks and pores to keep or prop them open after the pressure on the well is removed.

The gas employed in pneumatic fracking methods can be carbon dioxide, propane, nitrogen, or another gas. However, some gases, such as carbon dioxide and propane, liquefy at elevated pressures, limiting the pressure excursion on the well.

When nitrogen is used as the fracking gas, it must be pumped very quickly into the well, making it a difficult system to work.

There is a continuing need for improved fracking methods that can be employed to extract mineral resources from geological formations.

SUMMARY OF THE INVENTION

The present invention provides an improved method for enhancing the permeability of a geological formation surrounding a well, so as to permit enhanced extraction of mineral resources from the geological formation.

The present invention provides a fracking method including (1) providing first fluid, such as an aqueous solution or slurry, including at least one borohydride, such sodium borohydride or lithium borohydride or a mixture thereof, preferably at a concentration ranging from about 0.0001 percent to over 20 percent by weight, in a geological formation, such as by injecting the first aqueous solution or slurry by pumping the aqueous or slurry through a well, and (2) hydrolyzing the at least one borohydride in the geological formation to liberate hydrogen gas. In one presently preferred embodiment, hydrolysis is accomplished by including at least one alkaline material in the aqueous solution or slurry, the alkaline material preferably being in the amount of from about 0.0001 percent to about 20 percent by weight of the aqueous solution or slurry. In another embodiment of the method of the present invention, the first aqueous or slurry including the at least one borohydride is "chased" by providing to the geological formation a second fluid, such as an aqueous solution or slurry. In one aspect of this embodiment, the second fluid includes at least one acidic material effective to liberate of hydrogen gas from the at least one borohydride. In another aspect of this embodiment of the method of the present invention, the second fluid includes at least one catalytic material, such as a transition metal salt, effective to catalyze the liberation of hydrogen from the at least one borohydride. In one aspect of this embodiment, the borohydride is provided to the geological formation before the catalytic material is provided to the geological formation. In another aspect of this embodiment, the catalytic material is provided to the geological formation before the borohydride is provided to the geological formation.

The fluids employed in the present method, such as the first fluid including the at least one borohydride, and/or the second fluid including the at least one acidic material, and/or the second fluid including the at least one catalytic material, can optionally include other materials, such as proppants, bactericides, lubricants, flow modifiers, and the like.

Upon the acid neutralizing the alkaline material, the borohydride species will break-down and evolve hydrogen gas. Similarly, the at least one catalytic material will catalyze the production of hydrogen gas from the borohydride. The rate of evolution can be controlled by the concentration and quantities of the materials. The hydrolysis reaction can create pressures in excess of 10,000 pounds per square inch.

Once the fracking process of the present invention is completed, the by-products may be simple compounds including sodium chloride and sodium metaborate. This approach should be environmentally more acceptable than many fracking chemistries currently in use.

With the hydraulic fracking techniques currently in use, the average well requires 3 to 8 million U.S. gallons of water over its lifetime. Using borohydrides for in-situ hydrogen gas generation has the potential to significantly reduce the water consumed in fracking operations, which leaves more water available for other important uses such as agriculture.

The present invention provides a method for enhancing permeability of a geologic formation surrounding a well to thereby allow trapped fluids such as oil gas or water to flow to the well so that the extraction of the trapped fluids can become economically viable.

In one presently preferred embodiment, the method of the present invention includes the steps of (1) providing at least a first fluid comprising from about 0.0001 percent to about 20 percent by weight of at least one borohydride, preferably an alkali metal borohydride selected from the group consisting of sodium borohydride, lithium borohydride, and mixtures thereof, (2) pumping the first fluid into a geological formation through a well, (3) allowing the borohydride to undergo hydrolysis to thereby generate hydrogen gas, and (4) permitting the hydrogen gas to build or maintain sufficient pressure in the well and the surrounding formation for a sufficient duration to increase the permeability of the formation.

The method of the present invention may include the further steps of providing a second fluid and pumping the second fluid into geological formation through the well after the step of pumping the first fluid into the geological formation through the well. The second fluid can include an acid in order to enhance the hydrolysis of the alkali metal borohydride and the generation of hydrogen gas.

Preferably, the first fluid further comprises an alkaline material in an amount in the range of about 0.0001 percent up to about 50 percent by weight. In one aspect of the invention, the material is an alkali metal hydroxide or ammonium hydroxide. In a further aspect of the invention, the alkaline material is sodium hydroxide.

In another aspect of the invention, the second fluid is an aqueous acid solution and the acid is selected from hydrochloric acid, hydrofluoric acid, and combinations thereof. In yet another aspect of the invention, the second fluid includes a component selected from the group consisting of ammonium bifluoride, chelating agents, long chain carboxylic acids, formic acid, acetic acid, citric acid, and combinations thereof.

In yet another aspect of the invention, at least one of the first fluid and the second fluid includes a proppant selected from the group consisting of sand, aluminum oxide, ceramics, and combinations thereof. The terms "sand," "ceramic," and "proppant" as used herein are intended to encompass both coated and uncoated varieties unless otherwise specified.

In another aspect of the invention, at least one catalytic material, such as a transition metal salt, such as nickel salts and cobalt salts, is provided to the geological formation to catalyze the liberation of hydrogen from the at least one borohydride. The at least one catalytic material can be provided to the geological formation before the at least one borohydride is provided to the geological formation or after the at least one borohydride is provided to the geological formation. The at least one catalytic material can be provided in the form of an aqueous solution or slurry, and the aqueous solution or slurry can optionally include additional functional materials such as proppants, biocides, lubricants, flow modifiers, and the like.

In yet another aspect of the method of the present invention, the second fluid includes both at least one acidic material and at least one catalytic material, such that the at least one acidic material at least partially neutralizes an at least one alkaline material stabilizing the at least one borohydride, and the at least one catalytic material catalyzes the evolution of hydrogen from the at least one borohydride.

United States Patent Application Publication number 2012/0225800 A1, published Sep. 6, 2012, which is incorporated herein by reference in its entirety, provides examples of coated proppants suitable for use in the present invention. The coated proppants of U.S. Pub. No. 2012/0225800 A1 are coated with a polymer to increase their drag and thus increase the ability of the fracking fluid to carry them into a formation, which permits the use of a less viscous fracking fluid. The coated proppants may also be used as vehicles for carrying the additives needed for the fracking operation such as friction reducers, bactericides, oxygen scavengers, clay stabilizers, scale inhibitors, gelling agents, or the like. Accordingly, U.S. Pub. No. 2012/0225800 A1 also provides examples of fracking fluid additives useful for the present invention.

The proppant is preferably present in an amount ranging from about 3 to about 50 percent by weight. More preferably, the proppant is present in an amount ranging from about 4.5 to about 20 percent by weight. Even more preferably, the proppant is present in an amount of about 9.5 percent by weight.

In yet another aspect of the invention, at least one of the first fluid and the second fluid includes an additive selected from the group consisting of at least one bactericide, at least one lubricant, at least one corrosion inhibitor, at least one surfactant, at least one iron control agent, at least one viscosity increasing agent, at least one scale inhibitor, and combinations thereof. Such additives are usually present in a total amount of about 0.5 percent by weight or less.

In yet another aspect of the invention, the method of the present invention includes the further step of introducing a viscosity reducing agent into the second fluid near the end of the step of pumping the second fluid into the well.

In yet another aspect of the present invention provides a fracturing fluid composition comprising water, a proppant selected from the group consisting of sand, aluminum oxide, ceramics and combinations thereof, an alkali metal borohydride selected from the group consisting of sodium borohydride, lithium borohydride, and mixtures thereof, and an alkaline material selected from the group consisting of alkali metal and ammonium hydroxides and combinations thereof.

The alkali metal borohydride is preferably provided in an amount ranging from about 0.0001 percent to about 20 percent by weight in the fracturing fluid composition of the present invention. The proppant is preferably provided in an amount ranging from about 3 percent to about 50 percent by weight in the fracturing fluid composition of the present invention. The alkaline material is preferably provided in an amount ranging from about 0.0001 percent to about 50 percent by weight in the fracturing fluid composition of the present invention. Preferably, the alkaline material used in the fracturing fluid composition of the present invention is sodium hydroxide.

DETAILED DESCRIPTION OF THE INVENTION

Figure 1:
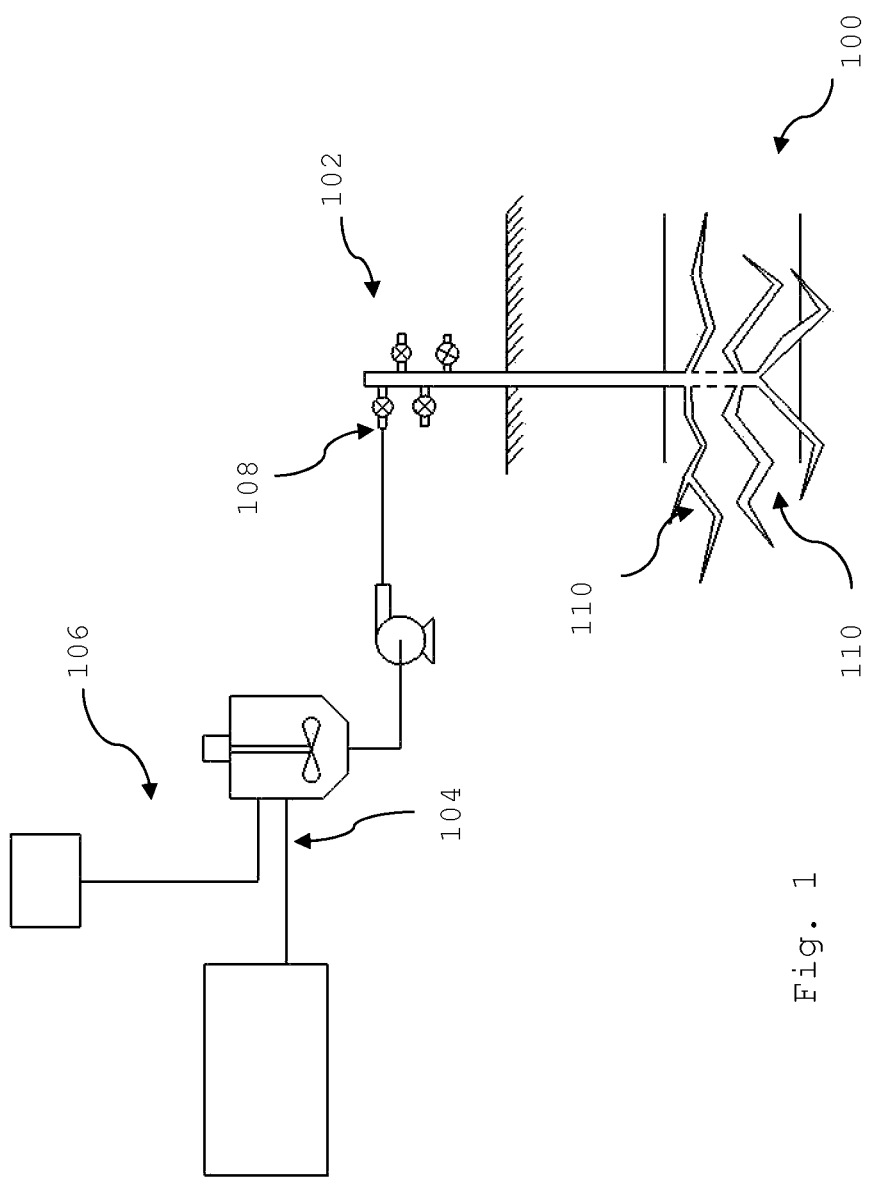
FIG. 1 is a diagrammatic view of a first embodiment of the present invention.

The present invention provides an improved method for enhancing the permeability of a geological formation surrounding a well, so as to permit enhanced extraction of mineral resources such as natural gas, petroleum, or water, from the geological formation. The present invention provides a "fracking" method which includes providing a first fluid, which can be an aqueous solution, suspension, or slurry. The first fluid includes at least one borohydride.

Borohydrides that can be employed in the present invention include sodium borohydride, lithium borohydride, potassium borohydride, zinc borohydride, calcium borohydride, lithium aluminum borohydride, sodium boron trimethoxy hydride, and the like. Preferably, the borohydride is stable in an aqueous solution, such as an alkaline aqueous solution. Preferably, the borohydride is selected from the group consisting of sodium borohydride, lithium borohydride, and mixtures thereof. Sodium borohydride is especially preferred.

Preferably, the at least one borohydride is provided in the first fluid at a concentration ranging from about 0.0001 percent to over 20 percent by weight of the first fluid.

Preferably, the first fluid also includes at least one alkaline material. The at least one alkaline material is preferably provided in the first fluid at a concentration ranging from zero to over 50 percent by weight. The at least one alkaline material is provided for the purpose of stabilizing the at least one borohydride while the first fluid is being provided in the geological formation.

The first fluid is provided in a geological formation by any conventional process, such as by injecting the first fluid into the geological formation by slurry by pumping the aqueous or slurry through a well.

The method of the present invention further includes either allowing the borohydride to hydrolyze to provide hydrogen gas, or providing a second fluid effective to enhance the formation of hydrogen gas, such as by "chasing" the first fluid with a second fluid.

In one embodiment, method includes providing as a second fluid, an aqueous solution, suspension or slurry including at least one acidic material, such as, for example, an aqueous hydrochloric acid solution.

In another embodiment, the method includes providing as a second fluid, an aqueous solution, suspension or slurry including at least one catalytic material effective to catalyze the formation of hydrogen gas from the at least one borohydride. Examples of catalytic materials useful in the method of the present invention include transition metal salts, such as salts of iron, cobalt, nickel, copper, manganese, and the like. Materials effective as hydrogen generation catalysts are disclosed, for example, in U.S. Pat. Nos. 5,804,329, 6,534,033, and 6,358,488, each incorporated herein by reference. The second fluid can be provided to the geological formation either before the first fluid is provided ("first" and "second" being used herein for purposes of identification, and not to indicate the temporal sequence in which the fluids are provided to the geological formation) or after the first fluid is provided to the geological formation. Preferably, the at least one catalytic material is provided in the form of a particulate with a high surface area, such as in the form, for example, of a particulate having a small average particle size, such as preferably having an average particle size of less than about 100 microns, more preferably less than 50 microns, and still more preferably less than 25 microns.

The first and/or the second fluids can optionally include other materials, such as proppants, bactericides, lubricants, flow modifiers, and the like.

In the method of the present invention, the at least one borohydride will break-down and evolve hydrogen gas, such as upon the at least one acidic neutralizing the alkaline material provided to stabilize the at least one borohydride.

The rate of evolution can be controlled by the concentration and quantities of the materials. The hydrolysis reaction can create pressures in excess of 10,000 pounds per square inch.

Using $NaBH_4$ as an example, the hydrolysis reaction of borohydrides is as follows:

$$NaBH_4 + 4H_2O \rightarrow NaBO_2 + 4H_2 \uparrow$$

Borohydrides, such as sodium borohydride, undergo self-hydrolysis in aqueous solution.

Referring to the Figures, wherein like reference numerals indicate like elements in each view, FIG. 1 is a schematic representation of the method of the present invention for enhancing permeability of a geologic formation 100 surrounding a well 102.

The method includes at least the following steps:
1) providing at least a first fluid 108 comprising an alkali metal borohydride;
2) pumping the first fluid into the formation 100 through the well 102; and
3) allowing the alkali metal borohydride to undergo hydrolysis to thereby generate hydrogen gas to thereby help build or maintain sufficient pressure in the well 102 and the surrounding formation 100 for a sufficient duration to expand and thus to increase the permeability of the formation to the desired level.

The first fluid is preferably an aqueous alkali metal borohydride solution. The alkali metal borohydride is preferably selected from the group consisting of sodium borohydride, lithium borohydride, and mixtures thereof. Because of the self-hydrolysis of borohydrides in aqueous solution, an inhibitor of the hydrolysis reaction is preferably included in the aqueous mixture if the aqueous mixture of borohydride is to be stored for a significant length of time. Alkaline material, such as NaOH for example, greatly inhibits the hydrolysis of the borohydride. Therefore, alkaline material is preferably added to the aqueous borohydride solution if the aqueous mixture of borohydride is to be stored for a significant period of time.

The borohydride is preferably present in an amount ranging from about 0.0001 percent to about 20 percent by weight. More preferably, the borohydride is present in an amount ranging from about 5 to about 20 percent by weight. Yet more preferably, the borohydride is present in an amount ranging from about 10 to about 20 percent by weight. Even more preferably, the borohydride is present in an amount of about 20 percent by weight.

Borohydrides such as sodium borohydride are in the form of a white solid powder at room temperature. In a first embodiment, if the sodium borohydride powder 106 is mixed with the fracking fluid 104 just prior to the injection of the borohydride containing fracking fluid 108 into the well, the addition of the alkaline material may not be necessary. Hydrogen gas will spontaneously evolve from the fracking fluid in the well allowing the formation fracturing pressure to be reached and maintained with a smaller volume of fracking fluid than would otherwise be possible.

Once the desired level of expansion of the geologic formation is achieved, the pressure on the well must be relieved before the well can be put into production. This usually occurs when the pumping of the fracking fluid is stopped. In the absence of the pressure of the fracking fluid 108, the flow passages 110 created by fracturing the formation may collapse back on themselves negating some or all of the gain in porosity and permeability of the formation obtained from the fracturing process. To prevent or reduce this loss of permeability, a proppant in the form of an essentially inert, granular solid is mixed into the fracking fluid 104 forming a slurry to which the borohydride 106 is then added. The proppant particles lodge in the flow passages 110 and reduce the instances or the likelihood of flow passage collapse.

Examples of suitable proppants include sand, aluminum oxide, ceramics and combinations thereof. The proppant is preferably present in an amount ranging from about 3 to about 50 percent by weight. More preferably, the proppant is present in an amount ranging from about 4.5 to about 20 percent by weight. Even more preferably, the proppant is present in an amount of about 9.5 percent by weight.

When a particulate or granular solid proppant is employed, it is preferable to include a viscosity increasing or gel forming agent in the fracking fluid in addition to the borohydride and the proppant. Viscosity increasing agents enhance the ability of the fracking fluid to carry the proppant deeper into the formation. Optionally, a viscosity reducing agent is added to the fracking fluid before the fracturing pressure is removed from the well so that the proppant is not dragged back out of the formation as there will be some backflow of the fracking fluid out of the well head due to the pressure in the geologic formation. Examples of suitable viscosity increasing agents and viscosity decreasing agents are set forth below.

Alternatively, as a substitute for or in combination with the proppant, an acid may be used to etch the flow passages resulting from the fracturing process so as to alter the shapes of their walls so that they cannot collapse back together. The acid may be included in the fracking fluid containing the borohydride, or the acid may be pumped into the well in a second fluid stream after the borohydride containing fracking fluid. If the geologic formation is silicate or silica based, the use of hydrofluoric acid (HF) or HF generating compounds would be preferred for etching the flow passages, but silicate or silica based proppants should preferably be avoided if HF or HF generating compounds are being used. With acidic fluid streams, corrosion inhibitors may be added to protect the well pipe, valves, pumps and other equipment. Suitable examples of such additives are enumerated below.

Figure 2:
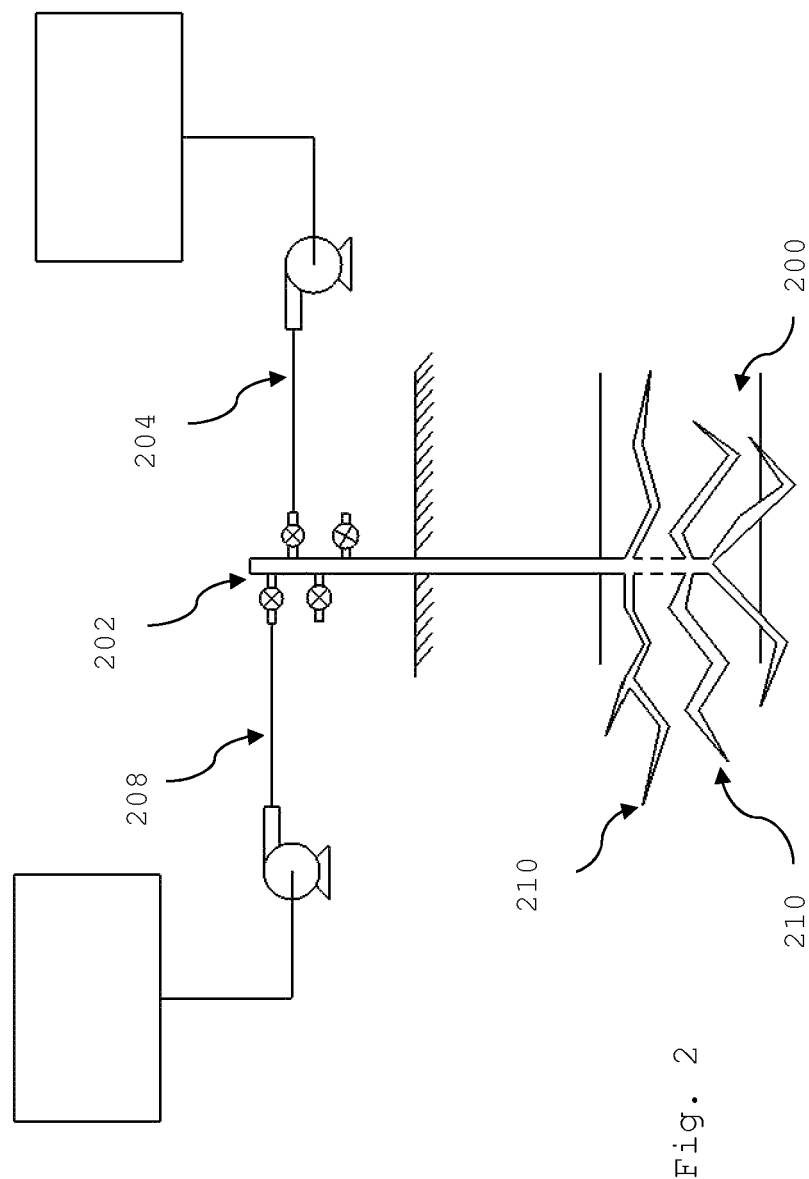
FIG. 2 is a diagrammatic view of a second embodiment of the present invention.

Referring to FIG. 2, in a second embodiment of the present invention, the fracking fluid 208 includes an alkaline material in addition to the borohydride. The alkaline material inhibits the hydrolysis of the borohydride. Not only does the alkaline material permit the storage of the borohydride containing fracking fluid for some period of time before it is pumped into the well 202, but the alkaline material allows the borohydride to reach deeper into the formation 200 and in greater concentration by inhibiting borohydride hydrolysis. However, it is then necessary to neutralize the alkaline material to obtain the rapid and copious hydrogen gas generation needed to achieve the high fracturing pressure required. Examples of suitable alkaline material include, but are not limited to, alkali metal hydroxides such as sodium hydroxide and potassium hydroxide, ammonium hydroxide, and their combinations. Sodium hydroxide is the most preferred alkaline material for use in the method of the present invention. The alkaline material is preferably present in an amount ranging from about 0.0001 percent up to about 50 percent by weight. More preferably, the alkaline material is present in an amount ranging from about 10 to about 50 percent by weight. Even more preferably, the alkaline material is present in an amount ranging from about 20 to about 50 percent by weight.

The second embodiment of the method of the present invention includes the further steps of providing a second fluid 204, and pumping the second fluid into the well 202 after the step of pumping the first borohydride containing fluid 208 into the well. In one presently preferred embodiment, the second fluid 204 includes an acid to neutralize the alkaline material to thereby enhance and promote the hydrolysis of the alkali metal borohydride and the generation of hydrogen gas.

Preferably, in one embodiment the second fluid 204 is an aqueous acid composition or solution and the acid is selected from hydrochloric acid, hydrofluoric acid, and combinations thereof. The acid should preferably be provided in an amount sufficient to neutralize the alkaline material. An excess of acid can be provided to etch the formation material as in the first embodiment. In another embodiment of the method of the present invention, the second fluid includes at least one catalytic material to catalyzed the evolution of hydrogen from the at least one borohydride. In one aspect of this embodiment, the second fluid is provided to the geological formation before the first fluid is provided to the geological formation. In another aspect of the method of this invention, the second fluid is provided to the geological formation after the first fluid is provided to the geological formation.

The second fluid may also include a component selected from the group consisting of ammonium bifluoride, chelating agents, long chain carboxylic acids, acetic acid, formic acid, citric acid, and combinations thereof, for etch the formation material.

One or both of the first fluid 208 and the second fluid 204 may include a proppant selected from the group consisting of sand, aluminum oxide, ceramics and combinations thereof for keeping flow passages 210 in the formation from collapsing shut when the pressure in the well bore drops. Thus, one or both of the first fluid 208 and the second fluid 204 may be aqueous slurries containing the proppant.

Proppants useful in the method of the present invention is preferably provided in an amount ranging from about 3 to about 50 percent by weight. More preferably, the proppant is present in an amount ranging from about 4.5 to about 20 percent by weight. Even more preferably, the proppant is present in an amount of about 9.5 percent by weight. Proppants useful in the method of the present invention are disclosed for example, in U.S. Pat. Nos. 6,780,804; 7,036,591; 7,666,469; 7,874,360; 7,976,949; and 8,614,157; each incorporated herein by reference.

One or both of the first fluid and the second fluid may include an additive selected from the group consisting of at least one bactericide, at least one lubricant, at least one corrosion inhibitor, at least one surfactant, at least one iron control agent, at least one viscosity increasing agent, at least one scale inhibitor, at least one viscosity reducing agent, and combinations thereof. The total amount of such additives present is no more than about 0.5 percent by weight.

As with the first embodiment, when a particulate or granular solid proppant is employed, it is preferable to include a viscosity increasing or gel forming agent in the fracking fluid in addition to the borohydride and the proppant. Viscosity increasing agents enhance the ability of the fracking fluid to carry the proppant deeper into the formation. Optionally, a viscosity reducing agent is added to the fracking fluid before the fracturing pressure is removed from the well so that the proppant is not dragged back out of the formation as there will be some backflow of the fracking fluid out of the well head due to the pressure in the geologic formation.

The fracturing fluids of the present invention may contain up to 90 percent by weight of water. The amount of water in any fracturing fluid in accordance with the present invention would be the amount required to make up the balance of the fracturing fluid composition after taking into account the amount of the borohydride, the amount of the alkaline material, the amount of the proppant, and the amount of any additives used in the fracturing fluid.

Examples of suitable viscosity increasing agents for use in the present invention include, but are not limited to, isopropanol, guar gum or its derivatives (hydroxypropyl guar, carboxymethyl hydroxypropyl guar), carboxymethyl cellulose, hydroxyethyl cellulose, carboxymethyl hydroxyethyl cellulose, hydroxypropyl cellulose, methyl hydroxyl ethyl cellulose, and other water-soluble gelling agents. Examples of suitable viscosity decreasing agents for use in the present invention include, but are not limited to, oxidizers and enzymes.

U.S. Pat. No. 8,604,132 B2, issued on Dec. 10, 2013, to Jakubowski et al., which is incorporated by reference herein in its entirety, provides examples of "star macromolecules" that may be useful as an additive for controlling the rheology of the fracking fluids of the present invention.

Examples of suitable corrosion inhibitors for use in the present invention include, but are not limited to, citric acid, formic acid, amines, quaternary ammonium compounds, and other commercial corrosion inhibitor packages.

Examples of suitable bactericides for use in the present invention include, but are not limited to, glutaraldehyde, formaldehyde, acrolein, ortho-phthalaldehyde, other aldehydes, quaternary phosphonium compounds, quaternary ammonium surfactants, cationic polymers, organic bromides, metronidazole, isothiazolones and thiones, organic thiocyanates, phenolics, alkylamines, diamines, triamines, dithiocarbamates, 2-(decylthio)ethanamine (DTEA) and its hydrochloride, triazine derivatives, oxazolidines, alkylaminomethylenephosphonic acid amphiphilic compounds, sulfamic acid surfactants, and anthraquinone.

Examples of suitable scale inhibitors for use in the present invention include, but are not limited to, ethylene glycol.

Examples of suitable lubricants for use in the present invention include, but are not limited to, polyacrylamide and other friction reducers. These work by decreasing turbulence in fluid flow so as to decrease pipe friction, thus allowing the pumps to pump at a higher rate with a lower pressure than would otherwise be possible. Examples of other suitable lubricants for use in the present invention include, but are not limited to, methanol and ethylene glycol.

Examples of water-wetting surfactants suitable for use in the present invention include, but are not limited to, anionic surfactants such as alkyl ethoxylates and alkylphenyl ethoxylates and mutual solvents such as monobutyl glycol ether and dipropylene glycol methyl ether.

Iron reducing agents may be added to prevent iron precipitates from plugging up flow passages. Examples of iron reducing age suitable for use in the present invention include, but are not limited to, chelating agents such as EDTA and reducing agents such as tin (II), copper (I), iodide salts, iodine, formic acid, hypophosphorous acid or a hypophosphorous acid precursor catalyzed by antimony (V) or copper (II), isoascorbic acid, ascorbic acid, and reducing thioacids such as thioglycolic acid with catalysts such as copper (II) ions or iodide ions or ketones that react with sulfides.

The equipment used in the fracturing process of the present invention include, without limitation, slurry blenders, one or more high-pressure, high-volume fracturing pumps (typically powerful triplex or quintuplex pumps) and a monitoring unit. Other equipment includes one or more units for storage and handling of proppant and various fracking fluids, a chemical additive unit (used to accurately monitor chemical addition), low-pressure flexible hoses, and many gauges and meters for flow rate, fluid density, and treating pressure. The fracturing equipment operates over a range of pressures and injection rates, and can reach up to 15,000 psi and 265 liters per second.

The fracturing pressures created by the process of the present invention preferably range from about 5,000 to about 15,000 psi. More preferably, the fracturing pressures created by the process of the present invention preferably range from about 8,000 to about 15,000 psi. Even more preferably, the fracturing pressures created by the process of the present invention preferably range from about 10,000 to about 15,000 psi.

Although the illustrative embodiments of the process of the present invention described above show the same well used for injection of the fracking fluids and extraction of the fluid trapped in the geologic formation, it is possible to apply the process of the present invention in situations where the injection of the fracking fluids and extraction of the fluid trapped in the geologic formation are carried out through different wells. The present invention is not limited to the illustrative embodiments, but includes any and all embodiments within the scope and spirit of the appended claims.

The invention claimed is:

1. A method for enhancing permeability of a geologic formation surrounding a well, the method comprising the steps of:
    providing a first fluid comprising at least one borohydride, the at least one borohydride comprising from about 0.0001 percent to about 20 percent by weight of the first fluid;
    pumping the first fluid into the formation;
    providing a second fluid including at least one acidic material;
    pumping the second fluid into the formation after said step of pumping the first fluid into the formation;
    providing at least one transition metal salt to the geological formation to enhance the liberation of hydrogen gas; and
    allowing the at least one borohydride to undergo hydrolysis to thereby generate hydrogen gas, the hydrogen gas increasing the permeability of the formation,
    wherein the first fluid further comprises an alkaline material in an amount in the range of about 0.0001 percent up to about 50 percent by weight,
    wherein the alkaline material is selected from the group consisting of sodium hydroxide, potassium hydroxide, and ammonium hydroxide.

2. A method according to claim 1, wherein the at least one borohydride is selected from the group consisting of sodium borohydride, lithium borohydride, and mixtures thereof.

3. A method according to claim 1, the second fluid enhances the hydrolysis of the at least one borohydride and the generation of hydrogen gas.

4. A method according to claim 3, wherein the at least one acidic material is selected from the group consisting of hydrochloric acid, hydrofluoric acid, and mixtures thereof.

5. A method according to claim 3, wherein the second fluid includes a component selected from the group consisting of ammonium bifluoride, chelating agents, long chain carboxylic acids, formic acid, acetic acid, citric acid, and combinations thereof.

6. A method according to claim 1, wherein the at least one transition metal salt is provided to the geological formation before the fluid including the at least one borohydride.

7. A method according to claim 1, wherein the at least one transition metal salt is provided to the geological formation after the fluid including the at least one borohydride.

8. A method according to claim 1, wherein the at least one transition metal salt is selected from group consisting of the salts of cobalt and the salts of nickel.

9. A method according to claim 1, further comprising providing at least one proppant to the geological formation, the proppant being selected from the group consisting of sand, aluminum oxide, ceramics, and mixtures thereof.

10. A method according to claim 9, wherein the at least one proppant is provided in an amount ranging from about 3 to about 50 percent by weight of the first fluid.

11. A method according to claim 9, wherein the at least one proppant is provided in an amount ranging from about 3 to about 50 percent by weight of the second fluid.

12. A method according to claim 1, the method further including providing at least one additive selected from the group consisting of at least one bactericide, at least one lubricant, at least one corrosion inhibitor, at least one surfactant, at least one iron control agent, at least one viscosity increasing agent, at least one scale inhibitor, and mixtures thereof.

13. A method according to claim 12, wherein the at least one additive is provided in a total amount of about 0.5 percent by weight.

14. A method according to claim 1, further including providing a second fluid to the geological formation, wherein at least one of the first fluid and the second fluid includes at least one viscosity increasing agent, the method further comprising the step of introducing a viscosity reducing agent into the second fluid near the end of said step of pumping the second fluid into the formation.

* * * * *